T. H. LINDSEY.
AUTOMATIC TRAP NEST.
APPLICATION FILED NOV. 8, 1910.

1,008,043.

Patented Nov. 7, 1911.
4 SHEETS—SHEET 2.

T. H. LINDSEY.
AUTOMATIC TRAP NEST.
APPLICATION FILED NOV. 8, 1910.

1,008,043.

Patented Nov. 7, 1911.
4 SHEETS—SHEET 4.

Witnesses

Inventor
T. H. Lindsey
By Harry E. Chandler
Attorney

UNITED STATES PATENT OFFICE.

THOMAS H. LINDSEY, OF ASHEVILLE, NORTH CAROLINA.

AUTOMATIC TRAP-NEST.

1,008,043.     Specification of Letters Patent.     Patented Nov. 7, 1911.

Application filed November 8, 1910. Serial No. 591,291.

*To all whom it may concern:*

Be it known that I, THOMAS H. LINDSEY, a citizen of the United States, residing at Asheville, in the county of Buncombe and State of North Carolina, have invented certain new and useful Improvements in Automatic Trap-Nests, of which the following is a specification.

This invention relates to an automatic trap-nest which is particularly adapted for use in connection with poultry breeding.

The object of the invention is to construct a trap of the character described in such a manner that the fowl will not be trapped unless she deposits an egg but while she is in said trap she is protected from the intrusion of other hens.

Another object of the invention is to construct the trap in such a manner that it is impossible for the hen to break or eat the egg, the latter dropping by its own gravitation to a movable basket located below the nest, said basket being in operative connection with suitable mechanism operated in conjunction with a hinged platform.

A further object of the invention is in the employment of a movable platform actuated by the weight of the fowl, whereby the doors of the trap are automatically opened and closed for the purposes previously described.

Other objects and advantages will appear from the description to follow, whereby an electric bell or other alarm is sounded at a remote point when an egg is deposited or laid, thus saving time for the attendant, and further in providing means for automatically displaying a sign or other signal at the trap which will indicate at a glance that the nest needs immediate attention.

Figure 1:
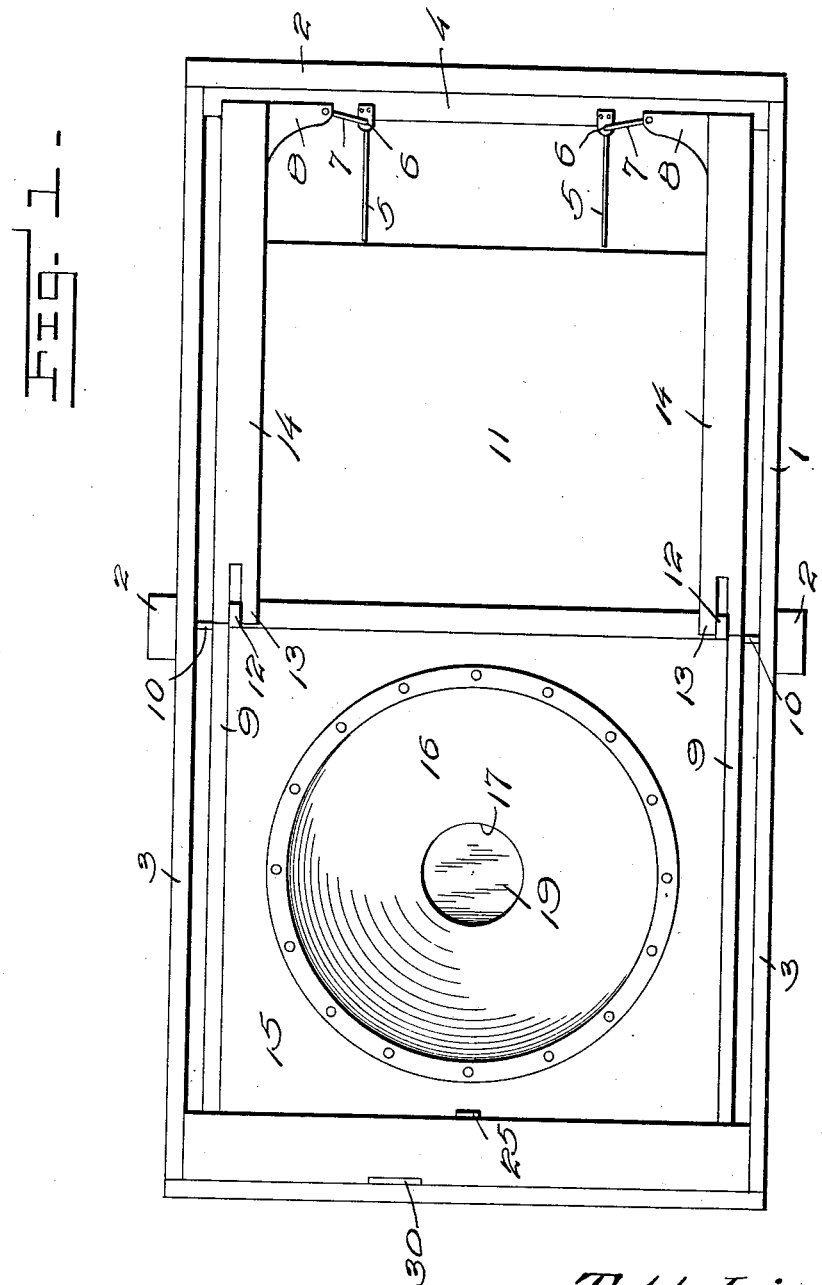
Figure 2:
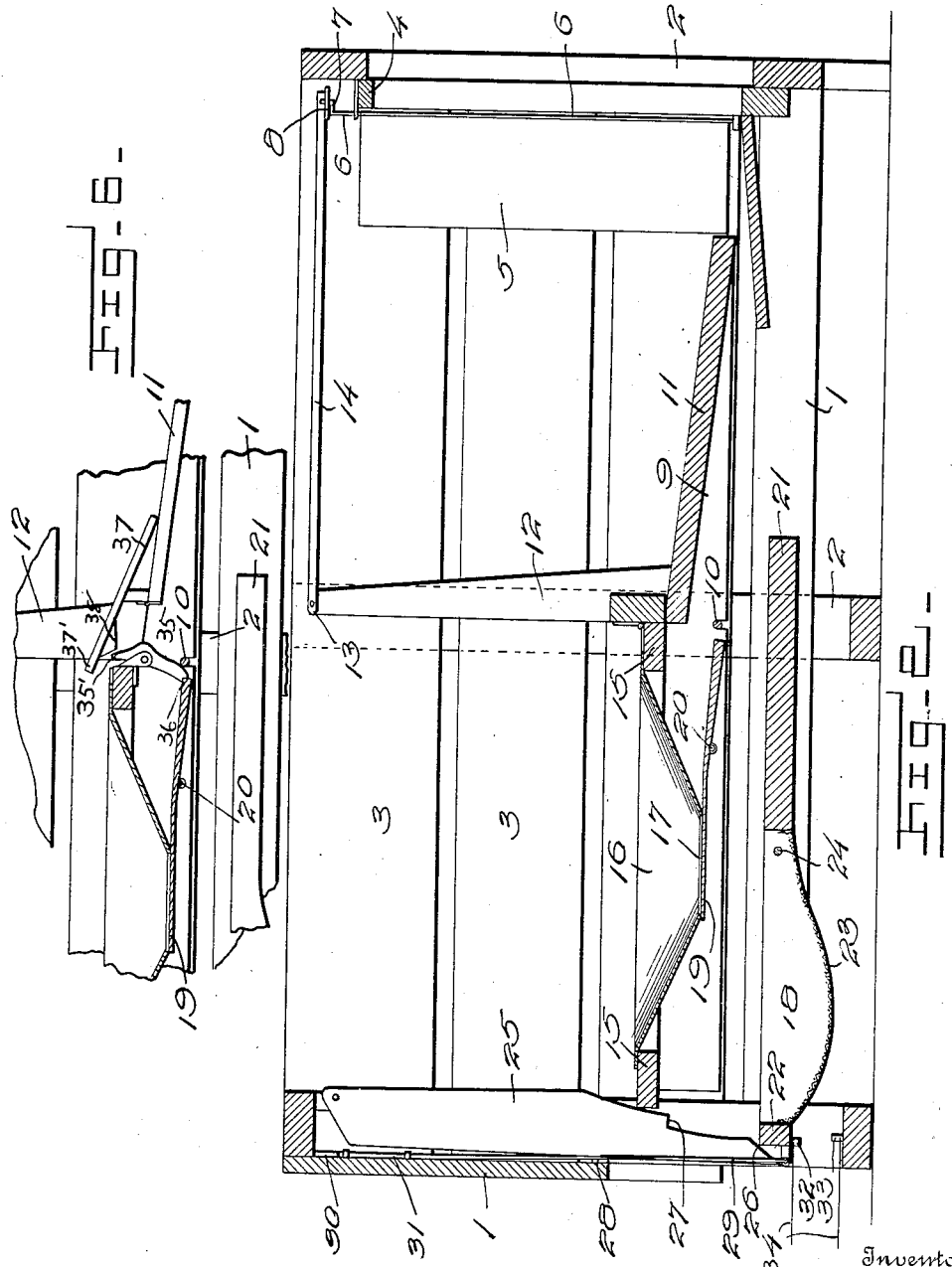
Figure 3:
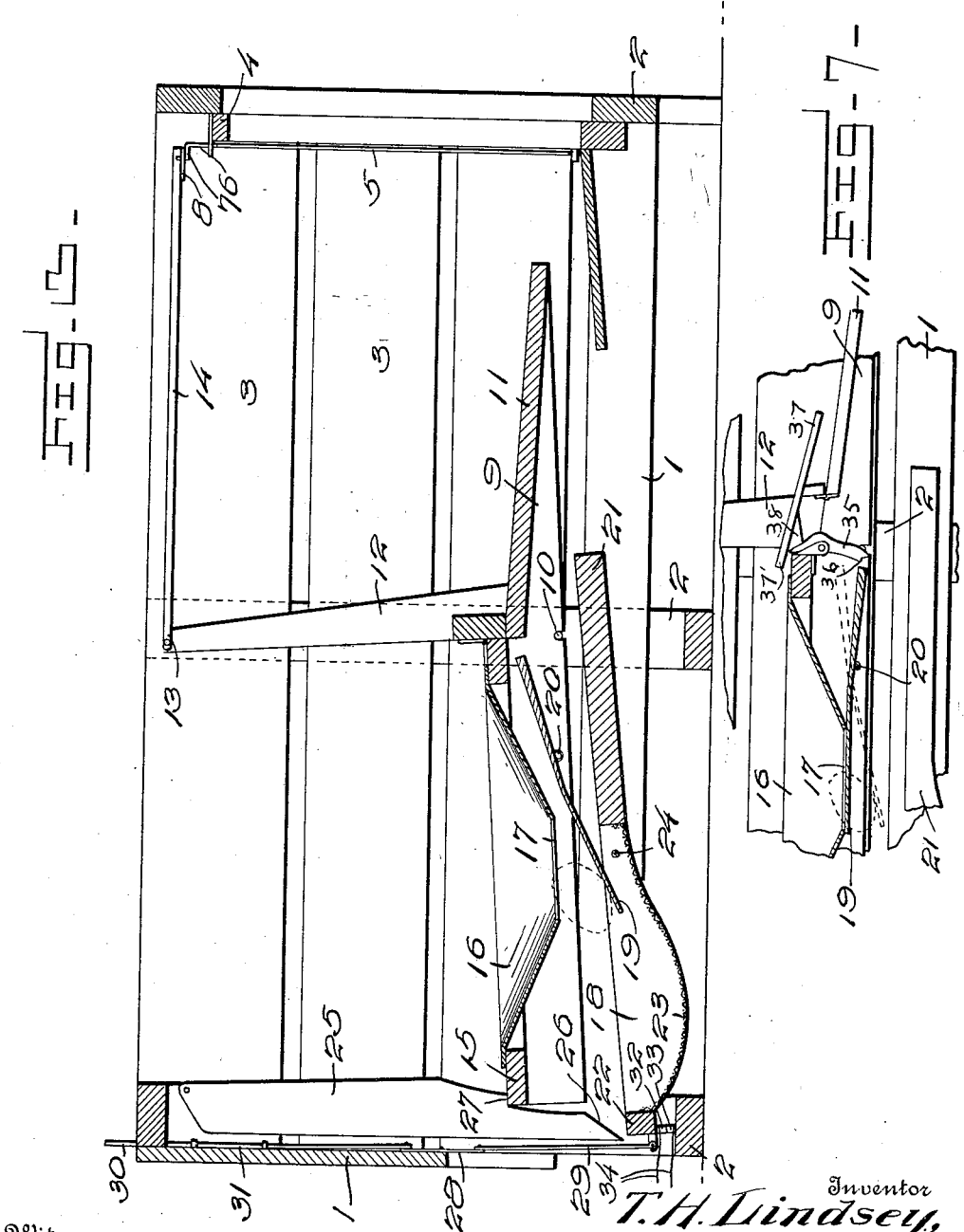
Figure 4:
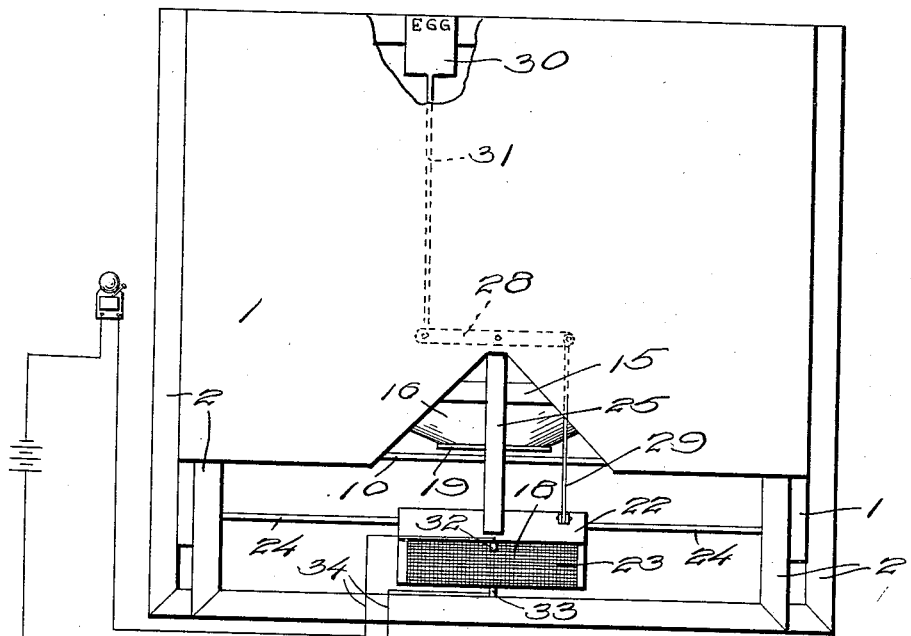
Figure 5:
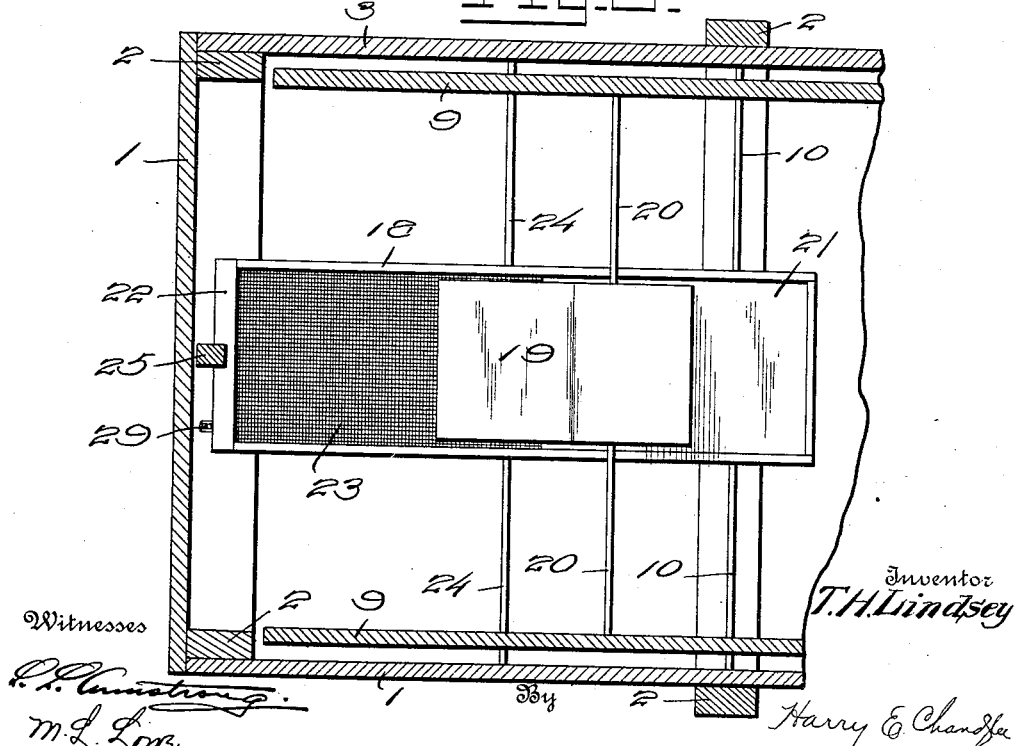

In the drawings: Figure 1 is a top plan view of the complete invention showing the parts in their normal position, Fig. 2 is a vertical longitudinal section of the same, Fig. 3 is a vertical longitudinal section of the nest through the basket portion thereof, showing the parts in a reverse position, Fig. 4 is an end view of the trap showing the same partly broken away to more clearly show the arrangement of the signal and parts for operating the same, Fig. 5 is a longitudinal horizontal section of the trap above the nest. Fig. 6 is a partial longitudinal section through the device showing the egg trip latch in locked position. Fig. 7 is a similar view, the egg trip latch being shown in released position.

Referring to the drawings: 1 represents a trap of suitable design and construction and preferably oblong, the same being composed of uprights 2 and longitudinally arranged side boards 3 which are properly separated for ventilation, the forward uprights 2 of the trap being properly spaced relative to one another for the free passage of the fowl. Secured to the upper and lower portions of the forward uprights 2 are cross or connecting strips 4 and hingedly supported by the same are two doors 5 by rods 6 fixed to the edges of said doors, the upper ends of said rods being bent in the form of a crank arm 7 to the end of which is attached a plate 8.

The movable platform 9 is mounted in the centrally located uprights 2 by means of a shaft 10 and is composed of a forward inclined portion 11 the edge of which is located adjacent to the entrance of the trap but not interfering in any manner with the free movement of the door. Hingedly secured to the upper surface of the platform 9 about its medial portion is a U-shaped frame 12 the upper terminal ends of which are movably connected to the forked ends 13 of the connecting bars 14, the latter having their opposite ends also movably secured to the plates 8 fixed to the upper angular or crank shaped ends of the shaft 6 to which the doors 5 are secured. The opposite end of the platform 9 is constructed in the form of a frame 15 having a circular opening which is covered by a concave disk 16 having a central opening 17 of sufficient size to permit the egg to freely pass through the same and into the basket 18 located below the disk 16. Hingedly secured to the opposite members of the platform 9 is a curvilinear plate 19 mounted upon a shaft 20, one end of which plate is heavier than the other, whereby the lighter end is adapted to normally close the opening 17 in the disk 16 but will permit the egg to freely pass through said opening 17 and into the basket 18 located below.

The receiving basket 18 is composed of oppositely located side members 21 and a connecting end strip 22, the bottom of the frame thus constructed being composed of wire or other netting 23 for yieldingly receiving the egg deposited, the receiving basket thus constructed being movably secured upon a shaft 24 mounted in the opposite lower side members of the trap.

Hingedly attached to the rearward closed end of the trap is a gravity actuated latch 25, the lower end of which is provided with an inclined face or edge 26 which is adapted for engagement with the outer surface of the connecting strip 22 of the receiving basket 18 when the parts are in their normal position and the basket elevated before an egg is deposited therein, whereby the platform can freely move upon its shaft 10 when a fowl enters the trap in which instance the hinged doors 5 are simultaneously operated or closed while said fowl is within the trap.

The automatic gravity actuated latch 25 is provided with a stop shoulder 27 against which the outer edge of the frame 15 of the platform is adapted to come in contact when an egg is deposited and dropped into the receiving basket 18, whereby the doors 5 are automatically closed and will remain in such a position until opened by the attendant to permit the fowl to pass out of the trap after the egg has been properly deposited.

Movably secured to the inside of the rear wall of the trap is a lever 28 to one end of which is attached a connecting rod 29 leading to and connecting the transverse strip 22 of the receiving basket 18, and movably secured to the opposite end of said lever is an indicator or semaphore 30 which is adapted to be moved in a vertical direction with its upper end exposed above the upper edge of the closed end of the trap when an egg has been deposited within the receiving basket, said indicator being fixed to the upper end of a rod 31 which is properly guided in a vertical direction upon the inner surface of said closed end of the trap.

Fixed to the under surface of the connecting strip 22 of the receiving basket 18 is a metallic contact 32 and likewise secured to the transverse beam of the trap at that end of the same is a similar contact 33, and leading from said contacts are conducting wires 34 in connection with an ordinary battery and bell or other alarm located at a remote distance for indicating the deposit of an egg within the receiving basket when the latter is depressed by the weight of the egg and said contacts connected in the usual manner.

From the foregoing description it will be readily seen that when the various parts comprising the trap are in their normal position the doors 5 will be opened for the free entrance of the fowl, and that the egg receiving basket will be in an elevated position with its connecting strip 22 in contact with the beveled edge 26 of the gravity actuated latch 25 thereby holding the notch 27 of said latch out of contact with that end of the platform carrying the nest. While the parts are in this position the fowl may enter the trap unmolested and rest upon the nest and by her weight the doors 5 will be automatically closed by the tilting of the platform 9 thus preventing other fowls from entering the trap, and should she leave the nest without depositing an egg the said doors will automatically open by her weight upon the forward end of the platform.

Should a fowl enter the trap and rest upon the nest the doors of course will be automatically closed in a manner as before stated and when the egg is deposited the same will pass through the opening 17 of the nest and come in contact with the free end of the plate covering said opening whereby the egg by its own gravitation will be guided and properly directed to the receiving basket 18 located below the nest. The weight of the egg so deposited within the receiving basket will cause that end of the same to drop releasing the latch 25, the notch 27 of the latter preventing the platform 9 from moving in an upward direction and thereby holding the doors 5 in a closed position, thus preventing the fowl from leaving the trap until the attendant arrives and makes the proper entry as to the egg and fowl.

After the proper entry has been made and the egg removed from the receiving basket the latter will rise by its own gravitation and the automatic gravity actuated latch 25 is moved toward the closed end of the trap permitting the parts to assume their normal position, in which operation the doors 5 are simultaneously opened placing said trap and parts thereof in proper position for further use.

It is to be observed that the absence of springs in carrying out the perfect operation of the trap necessarily requires a nicety of adjustment of the various parts, and in this respect the forward end of the platform, 9, is slightly heavier than the nest end, the weight of the fowl causing the forward end to rise and by the movement operate the doors in a manner described. It is further to be observed that the basket 18 is likewise properly adjusted to cause its receiving end to be normally in an elevated position, and is operated in the reversed position by the weight of the egg for releasing the latch 25.

The trap designed is especially adapted for obtaining the eggs from good layers and those that have hard shells and the right color, and it is of course in this connection required to keep a record of each fowl so as to know her laying ability and the quality of the eggs obtained from her. By the use of the invention herein described this desired information may be readily obtained, and it will be known from what hen any egg is procured, thereby enabling an accurate and detailed record to be kept.

It will be apparent that changes in the form proportion, and minor details of construction may be resorted to without departing from the spirit or sacrificing any of the advantages of this invention.

Some hens are very timid and would be frightened with the arrangement above described. Were the hen to step on the plate 19, and said plate be depressed by her weight, she would be frightened and fail to lay. To obviate this I have provided the pivoted latch 35 having a notch 36 to receive the outer free end of the plate 19. A small platform 37 is pivotally arranged centrally of the platform 9. To the under face of the platform 37 is secured an inclined trip plate 38 which is adapted to engage the nose 35' of the latch 35 and release said latch. In the position shown in Fig. 6, the latch is set and should the hen become frightened when she steps on the tread 11', she would naturally fly forward, thus alighting in the nest 16. In the first form of the device she would be precipitated through the opening 17, thus frightening her so that she would not enter the nest again. By means of the latch 35, her weight would be supported on the plate 19. When she leaves the nest 16 and steps on the bar 37' of the platform 37, the latch will be released by means of the inclined trip 38, and the plate 19 allowed to tilt to deposit the egg in the basket 23.

What is claimed is:

1. An automatic trap-nest having an open end for the passage of a fowl, doors hinged to the trap and adapted to close said opening, a platform movably secured within said trap about its medial portion, a cross bar secured to said platform and provided with uprights, means for connecting said uprights to said doors for operating the latter upon movement of the platform, a nest carried by the rear end of the platform and provided with an opening, a receiving basket pivotally mounted in the frame of the trap and located below said nest, and a latch pivotally secured to the trap adjacent the nest and basket adapted to be released by the downward movement of the receiving basket for holding the platform in a position to hold the doors closed.

2. An automatic trap-nest comprising a suitable inclosure having an open end through which the fowl is allowed to enter, doors hingedly attached to the trap adjacent to said opening, a movable platform mounted within the trap about its medial portion, a U-shaped frame secured to the platform, bars connecting the doors with the upper ends of said frame whereby said doors are operated by the movement of said platform, a nest carried by the rear end of said platform and provided with an opening, a plate mounted in the platform one end of which is adapted to cover the opening in the nest, an egg receiving basket mounted within the opposite sides of the trap and adapted to be depressed by the weight of the egg deposited therein, and a gravity actuated latch movably secured to the closed end of the trap and having a lower inclined edge for engagement by the end of the basket, said latch having a shoulder located above the inclined edge formed thereon against which the nest portion of the platform is adapted to come in contact.

3. An automatic trap-nest comprising a suitable inclosure having an open and a closed end, doors hingedly attached to the frame work of said inclosure for closing said opening, crank arms extending from the hinged portions of the doors, a platform movable within said inclosure, a nest carried by one end of the same and having an opening formed therein, a U-shaped frame secured to said platform about its medial portion, connecting bars the forked ends of which are movably secured to the upper free ends of the U-shaped frame and having their opposite ends likewise secured to the upwardly extending crank arms leading from the doors, a gravity actuated plate one end of which is adapted to normally close the opening in the nest, a basket mounted in the opposite side members of the inclosure below the platform for receiving the egg deposited and adapted to be actuated thereby, a gravity operated latch the upper end of which is movably secured to the closed end of the inclosure and having a lower inclined engaging end for contact with the forward end of the basket, and a shoulder formed on the edge of said latch with which the edge of the platform is adapted to come in contact when the basket is depressed.

In testimony whereof I affix my signature, in the presence of two witnesses.

THOMAS H. LINDSEY.

Witnesses:
L. L. HIGGASON,
J. M. McCOMBERS.